Figure 5:
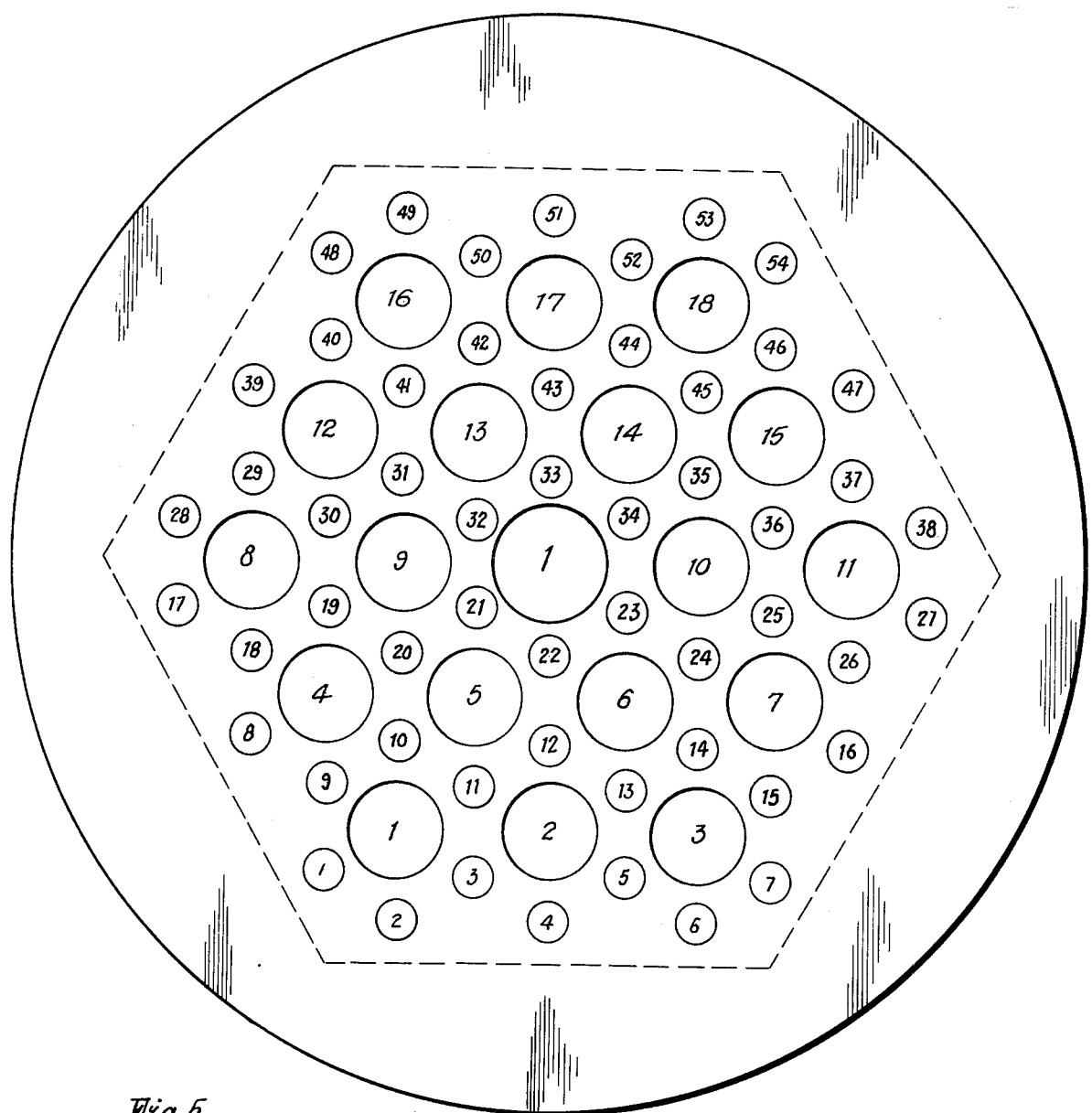

United States Patent [19]

Hrovat

[11] 4,092,384
[45] May 30, 1978

[54] BLOCK FUEL ELEMENT FOR GAS-COOLED HIGH TEMPERATURE REACTORS

[75] Inventor: Milan F. Hrovat, Oberrodenbach, Germany

[73] Assignee: Nukem GmbH, Hanau, Germany

[21] Appl. No.: 553,205

[22] Filed: Feb. 26, 1975

Related U.S. Application Data

[63] Continuation of Ser. No. 3,284, Jan. 16, 1970, abandoned.

[51] Int. Cl.² ............................................. G21C 21/00
[52] U.S. Cl. ................................. 264/.5; 252/301.1 R
[58] Field of Search ................... 264/.5; 252/301.1 R; 425/405 H

[56] References Cited

U.S. PATENT DOCUMENTS

| 3,220,103 | 11/1965 | Simons | 264/.5 |
|---|---|---|---|
| 3,462,797 | 8/1969 | Asbury | 425/405 H |
| 3,499,066 | 3/1970 | Murray | 425/405 H |
| 3,502,755 | 3/1970 | Murray | 425/405 H |
| 3,550,198 | 12/1970 | Roberts | 425/405 H |
| 3,557,405 | 1/1971 | Bowles | 425/405 H |

OTHER PUBLICATIONS 246,320 01001963 AU 264 .5

Primary Examiner—Peter A. Nelson
Attorney, Agent, or Firm—Frederick W. Turnbull

[57] ABSTRACT

The invention concerns a block fuel element consisting of only one carbon matrix which is almost isotropic of high crystallinity into which the coated particles are incorporated by a pressing process. This block element is produced under isostatic pressure from graphite matrix powder and coated particles in a rubber die and is subsequently subjected to heat treatment. The main component of the graphite matrix powder consists of natural graphite powder to which artificial graphite powder and a small amount of a phenol resin binding agent are added.

10 Claims, 6 Drawing Figures

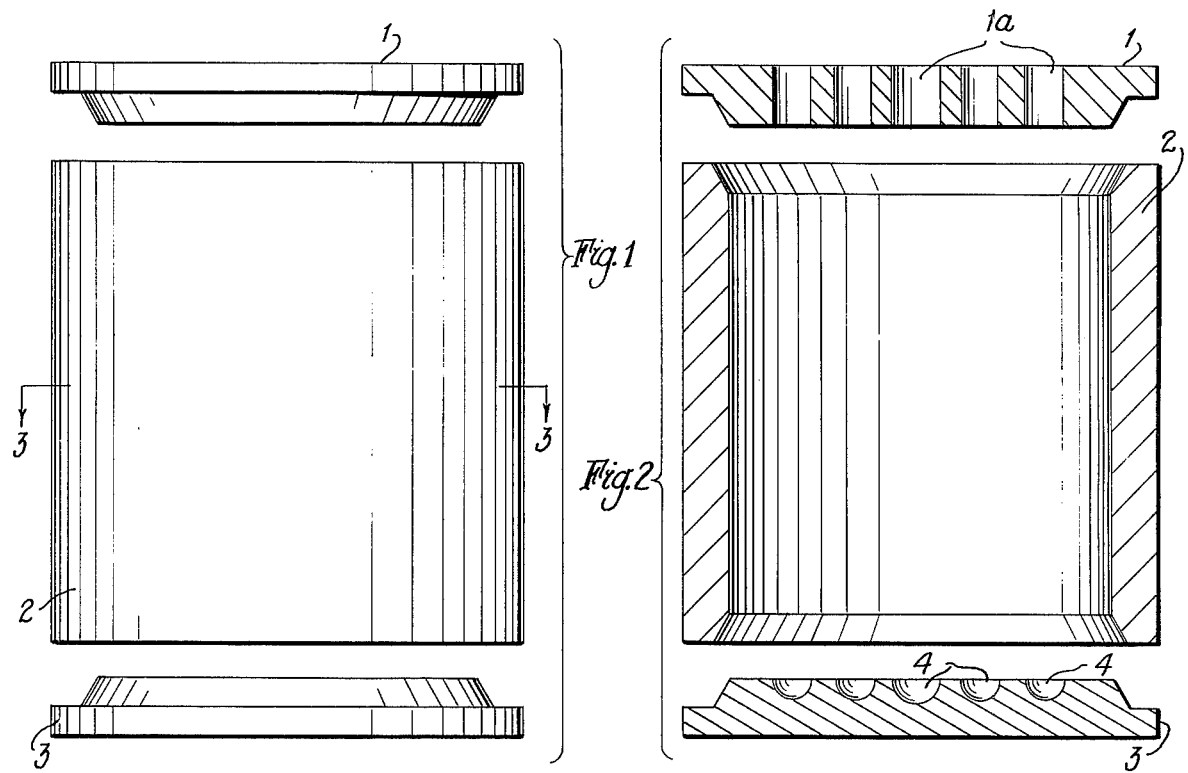
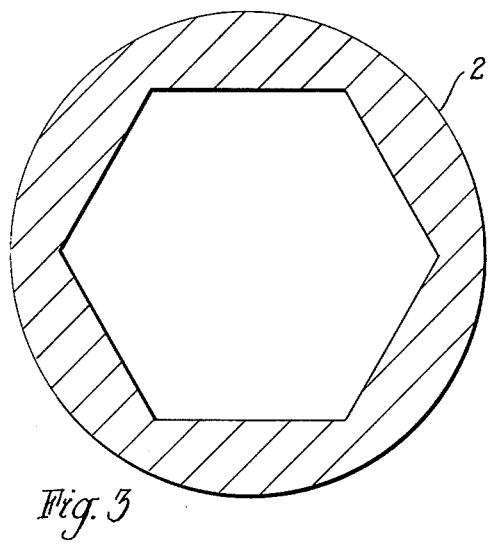
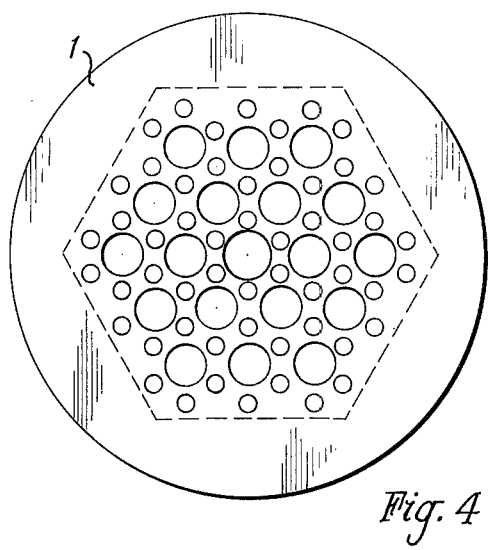

BLOCK FUEL ELEMENT FOR GAS-COOLED HIGH TEMPERATURE REACTORS

This is a continuation of application Ser. No. 3,284 filed Jan. 16, 1970, and now abandoned.

The invention concerns a block fuel element consisting of only one carbon matrix which is almost isotropic of high crystallinity with relation to the definition of the term "crystallinity" see USAEC Reports GA 8700 and GA 9972, into which the coated particles are incorporated by a pressing process. This block element is produced under isostatic pressure from graphite matrix powder and coated particles in a rubber die and is subsequently subjected to heat treatment. The main component of the graphite matrix powder consists of natural graphite powder to which artificial graphite powder and a small amount of a phenol resin binding agent are added.

With regard to the arrangement of the fuel a method to produce two different types of fuel elements is described; a so called homogeneous element, which is suitable for the uranium-thorium fuel cycle, and a so called heterogeneous element which is suitable for the cycle with low enriched uranium.

Block fuel elements made of graphite are usually used in gas-cooled high temperature nuclear reactors. The fuel element is a graphite prism provided with several cooling channels and contains fissile and fertile materials each a in the form of coated particles. These coated particles are spherical uranium-thorium-oxide or carbide kernel with a diameter of several hundred $\mu$, which are coated, preferably, with several layers of carbon that has been pyrolitically precipitated. The graphite which is used, at the same time, as the material that forms the structure, acts as a heat conductor and as a moderator. With regard to the arrangement of the fuel, a differentiation is made herein between two types of core elements: a homogeneous core element which is suitable for the uranium-thorium fuel cycle, and a heterogeneous core element which is suitable for the cycle with low enriched uranium.

The definition of "homogeneous" as used herein is that the graphite prism consists generally of a homogeneous mixture of coated particles and of graphite. In the finished homogeneous prism, however, there will be a thin coating of graphite unmixed with fuel particles that surrounds the entire prism.

The definition of "heterogeneous" as used herein is that the body of the graphite prism is, for the most part, only graphite but in certain parts contains a mixture of graphite and fuel particles that, having been isostatically compressed within the graphite at the time of final pressing makes the fuel particles integral with the graphite prism so that the entire fuel element is substantially isotropic instead of, as in the known block fuel elements, merely fuel particles and graphite packed into holes in a rigid graphite prism which cannot result in an isotropic fuel element. There will, of course, be a layer of graphite without fuel particles between the parts including fuel particles and the exterior surface of the fuel block.

The word "isotropic" as used herein is in accordance with the definition found in "Websters Third New International Dictionary of the English Langrage" (unabridged);

"Exhibiting properties (as conductivity of heat, compressability) with the same values when measured along axes in all directions."

The term "isostatic" from the same dictionary means:
"Subjected to equal presure from every side. (Isostacy) quality of state of being isostatic."

The fuel elements have to meet the following requirements:

Satisfactory ability of retention for the products of fission that are formed within the kernel of the coated particle. In order to meet this requirement, it is necessary that the coated particles are introduced into the core element without being destroyed.

High stability of radiation with regard to the mechanical stability and change in dimension.

Optimum arrangement of fuel with a symmetrical temperature profile.

Small in temperature gradient between the fuel particles and the cooling surface of the graphite. The temperature gradient is determined by a thermal contact of fuel particles to the graphite, thermal conductivity of the graphite and geometry.

High density of fuel, or power density.

Excellent resistance toward corrosion.

All types of fuel elements that have become known so far are based on the mechanical preparation of electrographite from which pentagonal or hexagonal prisms are produced.

The hexagonal prisms are about 787 mm high and their smallest diameter is approximately 355 mm. Each prism has a few hundred axial bores of which two-thirds are used to receive the fuel and the rest are used as cooling channels. The coated particles are either filled loosely into the bores or they are made into fuel sticks before they are introduced into the bores by gluing them into the shape with the aid of a binding resin and are then inserted into the bores.

The pentagonal prisms correspond approximately to the hexagonal prisms as far as the dimension is concerned. The most essential difference is that they have annular slits or slots which replace the bores.

A further type of fuel element has been proposed which is made of pressed compacts which contain the fuel. In this instance, the coated particles are mixed with a mixture of resin and graphite and pressed into the shape of compacts after which they are heat treated. These pressed and shaped compacts are subsequently inserted into the bores (the diameter is approximately 80 mm).

The disadvantages of the known fuel elements are the following:

1. The electro-graphite is shaped by machining, drilling, etc. Further, the production of prisms with either bores or annular slits is connected with considerable production costs and a high loss in graphite (up to 50%).

2. Impaired utilization of the volume of the fuel element, of which approximately 50% is used for the block graphite prism and a further 25% for the cooling channels. Therefore, only approximately 25% of the total volume is at the disposal of the fuel bodies containing coated fuel particles.

3. For fuel elements consisting of loose ore bound coated particles very bad thermal contact exists, both between the particles themselves and also between the particles and the graphite block. For this reason fuel channels filled with loose and bound fuel particles have a thermal conductivity lower than the block graphite by factor 6 to 10. One has to be content with a high number of bores with a very small diameter (for instance, a diameter of 12 mm with approximately 200 bores per block).

4. When using a block element where the fuel particles have been filled in loosely, one runs the risk that those particles, in case the block breaks, get into the cooling channels of the reactor where they would do damage to the heat exchanger or in the gas turbine.

5. The bound fuel of known fuel elements have a very bad radiation effect. The fuel elements with the bound particles consist of three different modifications of carbon with regard to crystallinity, isotropy (or lack of isotropy) and degree of graphitisation; electro-graphite as the shaped element, pyro-graphite as the coating material, and a carbon matrix as the binding agent for the fuel particles. The three types of carbon react differently during the radiation. As is well known, the carbon matrix is subjected to a great dimensional change, induced by the radiation, which leads to a premature break of the particles.

According to this invention, it is possible that all the above described disadvantages are avoided in that a block fuel element is produced which has good stability characteristics and is able to conduct heat in a satisfactory manner because it consists of only one carbon matrix which is almost isotropical and has high crystallinity and into which the coated particles are incorporated by an isostatic pressing process. Such a block fuel element of any chosen size with any desired fuel arrangement can be produced by means of a direct pressing process, whereby the coated particles are pressed with a suitable pressing powder and subsequently heat treated. Cooling channels, spacers which may be a layer of graphite, charging channel for the loading machine, and similar details are incorporated as desired during the pressing process.

The main component part of the press powder is a natural graphite powder to which are added a graphitic powder of petrolic coke and a small amount of a phenol resin binding agent. If necessary or desired, it is possible to replace the petrolic coke by ground electro-graphite powder or graphitised carbon-black.

The above powder is produced by first mixing the two graphite components, dissolving the binding agent, the resin, in methanol and subsequently kneading, drying and grinding of these initial components.

The natural graphite is a finely ground, nuclearly pure powder of extremely high crystallinity with the highest possible degree of graphitisation. It gives to the shaped element good thermal conductivity and leads, at the same time, to only one slight change in dimensions which is induced by the radiation.

The petrolic coke in the form of a graphite powder is added in order to avoid any formation of fissures in the pressed elements during the heat treating process. At the same time, it is possible, if the size of the grains of the petrolic coke and its amount have been chosen correctly, that the active effect of the radiation of the graphite matrix can be adapted or fitted to the active effect of the pyro-carbon. The binding agent, preferably phenol formaldehyde resin with, if possible, a high molecular weight, assures that the blocks have sufficient mechanical stability.

Since a relatively high pressure is used during the pressing process, the danger exists that the layers of pyro-carbon are smashed. In order to prevent this from happening, the coated particles are encased before the pressing process with a layer of graphite press powder. This layer has a thickness of only approximately 50 to 100 μ and is applied in the same manner as pills or chocolate-coated candies are made.

The pressing process must guarantee a uniformly strong compression of the mixture in both axial and radial directions isostatic. For this an isostatic pressing rubber die is preferred.

A rubber die with a prismatic hollow chamber is covered on the top and the bottom with a rubber cover. The upper cover is provided with bores through which rods made of rubber or metal are inserted for the purpose of forming the cooling channels in the prism. These rods extend parallel to the longitudinal axis of the prism and end in corresponding holes of the lower or bottom cover.

The homogeneous element can be produced by means of the pressing process in two steps, as follows:

In the first step, the coated particles and the press powder are introduced into the rubber die where they are mixed. The upper or top cover is placed upon the mold, the rods are introduced through the loosely filled pressing mixture, the die is closed, subjected to a vacuum, and isostatically pre-pressed in a liquid at a pressure of approximately 0.1 t/cm$^2$. Following that, the rods are removed and the result is a prism with cooling channels incorporated in it. The prism is stable enough at this stage so that it can be handled without becoming damaged.

The second step is as follows: The entire pressed element, including the cooling channels, is provided with an outer layer which is free from fuel and then it is again pressed until it reaches its desired and final density. In order to accomplish this, somewhat thinner rods are introduced into the cooling channels than were used in the first step and the intermediate spaces that are left are filled with press powder. The surface of the prism is subsequently surrounded with the same powder, the air contained in the rubber die is evacuated, and the die is subjected to its final pressing process at a high pressure (approximately 2 to 3 t/cm$^2$).

The result after these two steps is a block element with homogeneously distributed fuel particles which are surrounded or encased with a layer of uniform thickness; this outer layer does not contain any fuel.

An element with heterogeneous arrangement of fuel can be produced in a manner similar to the homogeneous fuel element. The first step in this instance is that a prism, made out of pure graphite press powder, is pre-pressed with the necessary number of channels. Following that, some of these channels are filled with the coated particles while adding a small amount of press powder. The remaining channels are retained for the cooling of the fuel elements in the reactor core. The encasing of the prism during the final pressing process can then be eliminated. It is possible to achieve in the fuel zones with suitable particles of fuel, densities of heavy metal up to 1.5 g/cm$^3$, without running the risk that the layers of the fuel particles are damaged during the pressing process. The isostatic pressure on the fuel element combines the coated particles and press powder into an isotropic union with the entire fuel element.

For the carbonisation of the binding resin, the pressed elements are slowly heated in an inert gas stream until the temperature reaches 800° C and following that they are annealed in a vacuum at approximately 2,000° C. Because the heavy metals begin to diffuse through the pyro-carbon the subsequent heat treatment is, limited to temperatures of less than 2,400° C and depends upon the characteristics of the layer of particles. If need be, this annealing process can be combined with a halogen cleaning.

Figure 6:
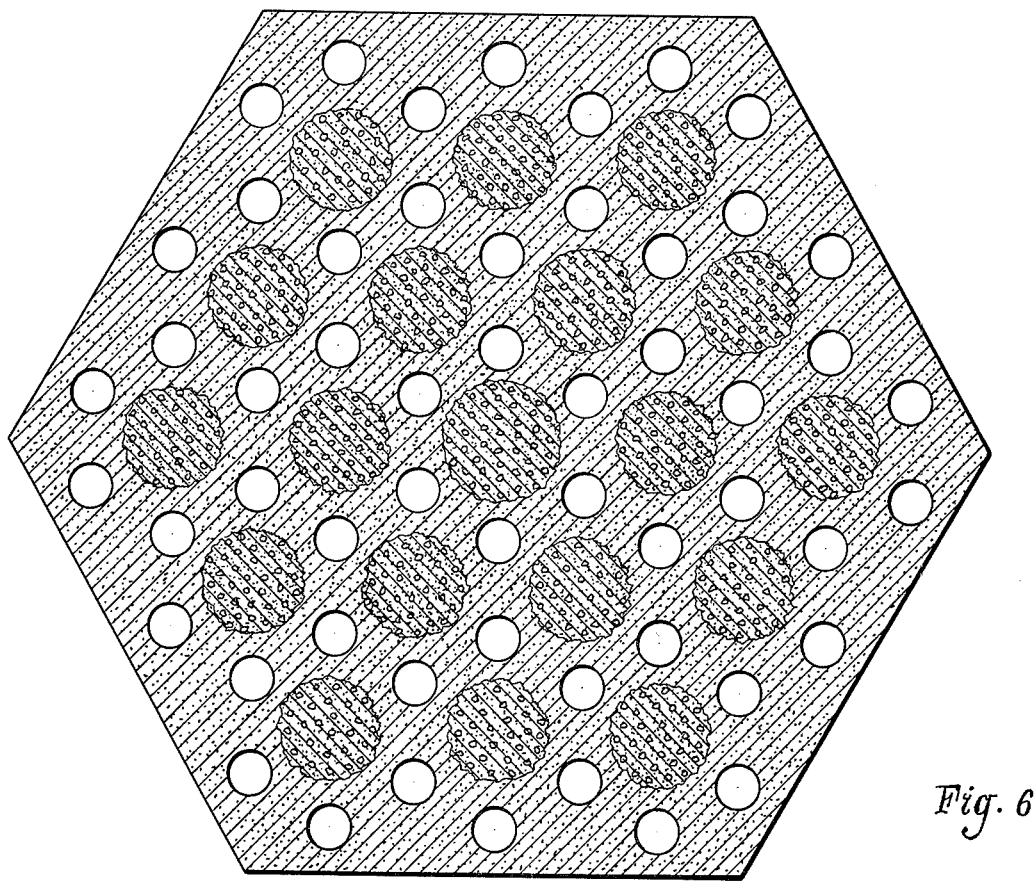

The means by which the objects of this invention are obtained are described more fully with respect to the accompanying drawings in which:

FIG. 1 is an exterior exploded view of the rubber die;
FIG. 2 is a section through FIG. 1;
FIG 3 is a section on line 3—3 of FIG. 1;
FIG. 4 is a plan view of the cover of FIG. 1; for the homogeneous block element and
FIG. 5 is a plan view of the cover for the heterogeneous block element.
FIG. 6 is a section through the finished heterogeneous block element.

Since the outer layer of the fuel elements does not contain any coated fuel particles, it is possible to perform post-annealing work on the cooling channels and the surface of the prisms.

The graphite matrix becomes refined during the final annealing process in that it is cleaned and the hydrogen is removed. Further, the binding coke is changed under the catalytic effect of natural graphite from a disorderly carbon structure into a higher, orderly carbon structure. The graphite matrix in this manner reaches the characteristics of stability and conductivity of a reactor refined graphite which has been well graphitized at a temperature of 3000° C. Because of the high crystallinity of the original graphite powder, together with good isotropy, one can expect an extremely favorable action of radiation.

The pressed block core element permits, because of its high usable volume, a considerable increase of the content of fuel per element. The isostatic pressing of the coated particles into the block guarantees a good thermal contact with the graphite matrix. The power density of the core elements can be increased considerably with a relatively low fuel temperature together with the high thermal conductivity of this matrix. With the favorable transfer of heat to the cooling gas it is possible to achieve thereby a much higher core power density in the nuclear reactor.

Because of a minimum of waste of graphite and the low number of steps needed to produce and finish the fuel elements, extremely low costs of production can be expected.

The press mixture is compressed in the elastic rubber die seen in the drawing under iso-static pressure (in a liquid) in two steps to the block element of the desired form. The rubber die is a cylinder that has a prismatic hollow chamber in it which is used to receive the press powder. The form of the hollow chamber remains unchanged during the pressing process, it merely becomes symmetrically smaller in an axial and radial direction. The hollow chamber, which determines the form of the block fuel element, can have any desired prismatic shape, for instance, the form of a trigonal, pentagonal, hexagonal or other shaped prism. The rubber die consists of three parts; a jacket 2, and upper and lower covers 1 and 3, respectively. FIGS. 1 to 4 show schematically the rubber die for the production of a hexagonal block fuel element with a homogeneous distribution of the fuel, whereby the seventy-three cooling channels or ducts are arranged in a hexagonal manner. The central channel is used, at the same time, for the insertion of the element into the core of the reactor.

EXAMPLE 1

Pressing of a So Called Homogeneous Block Fuel Element

After the jacket 2 has been placed onto the lower cover 3, then the press mixture, which consists of the jacketed, coated fuel particles and the graphite press powder, is filled or funneled in from the top into the inner hollow chamber of the rubber die and is then intimately mixed therein. Following that, the upper cover 1 is put in place. Seventy-three metal rods are then introduced through the holes in the upper cover into the loosely filled press mixture with the aid of an apparatus, which is set up above the rubber die. These rods seat in recesses 4 in bottom cover 3. The apparatus guarantees a satisfactory introduction of the metal rods, which are supported parallel to the longitudinal axis, one end in holes 1a in the top cover and the other end in cavities of the lower cover. The rubber die is then subjected to a vacuum and is closed thereby. The liquid is, in this manner, prevented from entering into the interior of the die during the pressing process. The die is then isostatically pre-pressed in a recipient at approximately 0.1 t/cm$^2$. After the metal rods are removed, a prism is formed that can be handled without breaking and which has channels or ducts that have been pressed in.

This is called a homogeneous block because the entire block is pressed from a homogeneous mixture of coated fuel particles and graphite press powder. It is necessary for this block of homogeneous mixture to be coated with graphite.

The pre-pressed prism, including the cooling channels, is provided, during the second step of the operation, with an outer layer of graphite that is free from fuel and then is pressed again in a finishing process until it obtains the desired final density. The same press powder is used for the outer layer as is for the core. The bottom portion of the same rubber die is, for this purpose, provided with a thin layer of graphite press powder. Following that, the prism, whose dimensions are smaller than those of the hollow chamber, is placed in position in such a manner that an even slot is formed all around. The metal rods are subsequently centered in the channels and their diameter is selected in such a manner that a slot of about 10 mm width is created between the surface of the channel and that of the metal rod. The metal rods are received by an apparatus that is set up outside of the rubber die. The hollow chamber or space between the rubber die and the surface of the prism, as well as the space between the surface of the channel and that of the metal rods is filled with press powder. Following that, the upper portion of the prism is covered with a uniform and even layer of graphite press powder and a second rubber cover is put in place. The dimensions of the rubber cover and the holes therein are exactly fitted to the dimensions of the pre-pressed prism and the metal rods. As a final step, the air contained in the rubber die is evacuated and the die is pressed at a high pressure (approximately 2 to 3 t/cm$^2$) into a block core element.

EXAMPLE 2

Pressing of a So Called Heterogeneous Block Fuel Element

Substantially the same rubber die is used for the pressing of a heterogeneous element. It differs from that used in Example 1 only in the construction of the upper and lower cover. FIG. 5 shows the cover from the top. The diameter of the cover corresponds to that as shown in FIG. 2. The relative enlargement is for making an easier observation of the arrangement of the holes.

During the first step, a prism is provided pre-pressed out of graphite press powder alone with large and small channels. The large channels are used to receive the fuel and the small ones are provided for the cooling. In order to accomplish this, the jacket 2 is put in place on the lower cover 3 and then the metal rods (thick and thin rods, as shown in FIG. 5) are inserted into the cavities of same. The rods are additionally held in their respective positions from the top with the aid of an apparatus. Then, the intermediate space or chamber is filled with graphite press powder. After the upper cover has been put in place, the rubber die is subjected to a vacuum, closed thereby, and pre-pressed isostatically at a pressure of 0.1 t/cm².

Since no fuel particles are in this element as it is pressed the first time, it does not comprise a "homogeneous" mixture as seen in Example 1. The fuel and further graphite powder is placed in the spaces left by removal of the large rods so, upon completion of the second step as described below, the block is a hetrogeneous fuel element.

The second step begins as follows: Only the thick metal rods are removed and the axial channels are provided, zone by zone, first of all with an approximately 10 mm thick layer of graphite powder at the lower end, then they are filled with the jacketed, coated particles – mixed with a small amount of graphite powder – and finally the top is filled with an approximately 10 mm thick layer of graphite powder. After a second rubber cover has been put in place, one which has only 55 holes corresponding to the smaller rods, the rubber die is subjected to a vacuum and is finally isostatically pressed in a receptacle at approximately 2 – 3 t/cm².

It will be seen then that in the second isostatic pressing of the fuel element the material of the fuel element compressed in the first isostatic pressing will be reformed and pressed along with the fuel particles and the graphite with which they are mixed into a substantially isotropic fuel element. In the second isostatic pressing the diameters of the material in the larger holes of the block as formed in the first pressing will be reduced as will the axial length.

Having now described the means by which the objects of this invention are obtained,

I claim:

1. A method of making a block fuel element comprising the steps of compacting a charge of graphite press powder to provide a self-sustaining prismatic preform of a block fuel element, said preform being formed with a plurality of channels extending therethrough parallel to the axis of said prismatic preform, filling selected channels of said preform first with a thin layer of graphite, then in the principal length of said selected channels with a jacketed, coated fuel particles mixed with a small proportion of a graphite powder, and finally with an additional thin protective layer of graphite, providing rods extending through the said channels which are not filled with fuel particles, and subjecting the preform carrying said fuel particles and said rods to an isostatic pressure sufficiently high to compress said channels radially against said fuel particles and said rods to form a uniformly densely compacted self-sustaining block fuel element.

2. A block fuel element as produced by the method of claim 1.

3. A method of making a block fuel element comprising the steps of compressing a mixture of jacketed coated fuel particles and graphite press powder into a homogeneous self-sustaining prismatic preform provided with cooling channels larger than desired in the completed fuel element, said channels extending parallel to the axis of said prismatic preform, placing said preform in a mold with rods the diameter of the desired cooling channels extending through the cooling channels of said preform and with a layer of graphite between said rods and said preform and with a layer of graphite entirely surrounding said preform, compressing said mold with said preform, rods, and graphite under an isostatic pressure of in excess of 2t/cm², to form a densely compacted block fuel element.

4. A block fuel element as produced by the method of claim 3.

5. A block fuel element for gas cooled high temperature reactors in the form of an isotropic prismatic block having cooling channels extending therethrough parallel to the axis of said prism formed of a dense isotropic homogeneous mixture of coated fuel particles and consolidated graphite press powder entirely surrounded by a dense protective layer of the press powder.

6. A block fuel element for gas cooled high temperature reactors in the form of a dense isotropic prismatic block of consolidated graphite press powder having cooling channels extending therethrough parallel to the axis of said prism characterized by longitudinal zones of a mixture of coated fuel particles and graphite press powder isotropically combined with said block of consolidated graphite press powder, said zones extending along lines parallel to said cooling channels.

7. A method of making a block fuel element comprising the steps of providing mold consisting of a rubber jacket having an interior axial shape of uniform cross section and upper and lower rubber covers, the upper cover being provided with apertures and the lower cover being provided with corresponding depressions in axial alignment with said apertures, filling said mold with a first material component of said block fuel element, wherein said first material component is selected from the group consisting of a mixture of coated fuel powder homogeneously mixed with graphite press powder and graphite press powder, closing said mold with a rod extending through each said aperture and into each said corresponding depression, subjecting the mold, with the enclosed first material component, to a sufficient isostatic pressure to compact said first material into a self-sustaining block, removing said block from said mold inserting the element along with further material components selected from the group consisting of graphite and a mixture of ocated fuel particles and graphite into a similar rubber mold with rods corresponding to cooling channels in the completed block fuel element, subjecting the mold and contents to vacuum, and subjecting the mold and contents to isostatic pressure of at least two tons per square centimeter, after which the block fuel element is removed from the mold and heat treated.

8. The method of claim 7, in which the first material component is a mixture of coated fuel particles homogeneously mixed with graphite press powder, and the further material component is graphite.

9. The method of claim 7, in which the first material component is graphite press powder, and the further material component includes a mixture of coated fuel particles and graphite.

10. A block fuel element as produced by the method of claim 7.

* * * * *